Jan. 4, 1972  V. MANDORF, JR., ET AL  3,632,708
USE OF EXPANDED ANISOTROPIC GRAPHITE AS MULTI-CAVITY
MOLD FOR HOT PRESSING
Filed March 26, 1969

INVENTORS
VICTOR MANDORF, Jr.
ROBERT G. FENISH
BY
ATTORNEY

United States Patent Office 3,632,708
Patented Jan. 4, 1972

3,632,708
USE OF EXPANDED ANISOTROPIC GRAPHITE AS MULTI-CAVITY MOLD FOR HOT PRESSING
Victor Mandorf, Jr., Olmsted Falls, and Robert G. Fenish, Parma, Ohio, assignors to Union Carbide Corporation, New York, N.Y.
Filed Mar. 26, 1969, Ser. No. 810,691
Int. Cl. B28b 7/16, 21/82; B22f 3/14
U.S. Cl. 264—58                                          10 Claims

ABSTRACT OF THE DISCLOSURE

A method for economically producing dense, refractory articles in large quantities by hot-pressing techniques is provided. A compressible retainer is provided with a plurality of cavities which are filled with a refractory material and the assembly is then subjected to a simultaneous temperature and pressure such as in a single ram mold. The pressure is applied until a desirable density is achieved in the refractory material and as many articles are produced in one pressing as there are cavities.

The anisotropic expanded graphite used as the compressible mold mode is compressible in the direction in which pressure is being applied but is not compressible in the transverse direction and therefore effectively restrains lateral dimensions of the pressed sample to essentially its initial dimensions. Other compressible mold materials are disclosed, however, they do not have the essential anisotropic compression properties of the anisotropic expanded graphite.

FIELD OF INVENTION

This invention relates to a method for forming refractory articles and more specifically to a process for economically manufacturing large quantities of refractory articles.

DESCRIPTION OF PRIOR ART

Small refractory articles of such materials as the borides, carbides, nitrides and oxides of titanium, zirconium, tantalum, boron and the like have always been difficult to fabricate in large quantities. Several methods of fabrication are employed, the most common being a hot-pressing process and preforming and sintering process. The latter process is frequently used if the refractory material is capable of densifying while sintering. If such a material is being processed, in this manner, large quantities can be made economically. However a hot-pressing process is required if the refractory is not capable of densifying by sintering or if the final article is to have a high density, small grain size, and high strength. Because the quantity of articles which can be produced in a single hot-pressing operation is limited, this process is not economical for large scale production purposes. Usually, a large mass of refractory material is hot-pressed and smaller articles are machined therefrom. The machining operation is of course time-consuming and costly, but also is rendered more difficult by the nature of the dense, hard materials involved and often requires diamond cutting and grinding.

Diamond cutting also imports severe physical damage to the surface of the refractories. Local temperatures and forces at the cutting surface are very high and result in micro cracks, residual stresses and crack nuclei. These effects of diamond cutting and often grinding influence the strength properties of the refractories.

It is therefore the primary object of this invention to provide a process which avoids the aforementioned difficulties and enables economical production of refractory articles to be readily accomplished.

DESCRIPTION OF THE INVENTION

Broadly, the process of the invention comprises employing at least one compressible retainer member having a plurality of cavities therein, the cavities being filled with the material to be processed, and subjecting the material and the retainer to a hot-pressing cycle. During the application of pressure, such as by a compression force of a single ram mold, the retainer yields in the direction of the force as does the refractory material in the cavities. However, the retainer is so structured that the degree of movement in the lateral direction i.e. the direction perpendicular to the applied force, is minimal. Thus the formed refractory articles within the cavities are caused to densify without a significant degree of lateral distortion. The shape of the cavity will therefore determine the shape of the final article.

It will be appreciated that a large number of refractory articles may be formed in a single ram mold, in a single hot-pressing sequence when a compressible multi-cavity retainer is used. The quantity produced may be varied by altering the size of the final article, the mold size, or by stacking a group of retainer members in line with the applied pressure. In the latter assembly, it is preferred that spacer members be inserted between the stacked retainers for support purposes as will hereinafter be further explained.

The compressible retainer member must be at least as compressible as the refractory material being formed, that is, it must yield to the ram pressure along with the refractory articles in the cavities until the articles have been satisfactorily densified. Thus the retainer material must not prevent movement or densification of the refractory at any time during the hot-pressing operation. In addition, the retainer material must be chemically and thermally stable at the high operating temperatures and chemically compatible with the refractory material so that the articles can be readily removed from the retainer after processing. Several materials have been found to function quite well as retainer members in the process of the invention. These materials include Grafoil[1] graphite, low density carbon, boron nitride, fiber reinforced graphites, and the like.

Grafoil graphite is the preferred retainer material of the invention. This unique material is formed by expanding graphite particles of natural or synthetic origin by a factor of at least 80 times in the C crystallographic axis dimension and then compressing the expanded particles to form a cohesive structure. The particles can be formed under a slight pressure into a foam material since the particles have the ability to adhere without a binder due to the large initial expansion. Tapes, sheets, strips and the like can be formed from the expanded particles by simply increasing the compressive pressure, the density of the formed graphite being related to the applied formation pressure. This graphite is highly anisotropic and because of this, it readily experiences a high degree of compressibility in the C direction even after formation and simultaneously resists movement in the AB crystallographic plane, which is perpendicular to the C axis. The use of this material as the compressible retainer in the process of this invention ensures that the refractory under treatment will undergo a maximum travel in the direction of applied pressure and a minimum of movement in the lateral or direction perpendicular to the direction of hot-pressing. For example, a number of titanium diboride articles 0.75 inch in diameter which were hot-pressed in a Grafoil

[1] Grafoil—Registered trademark of Union Carbide Corporation.

retainer member increased a maximum size of only about 4 percent in diameter. Grafoil graphite and the process of making the same are fully described in U.S. Pat. 3,404,061, issued on Oct. 1, 1968.

DESCRIPTION OF THE DRAWINGS

The invention will be more readily understood by referring to the drawings, wherein.

Figure 1:
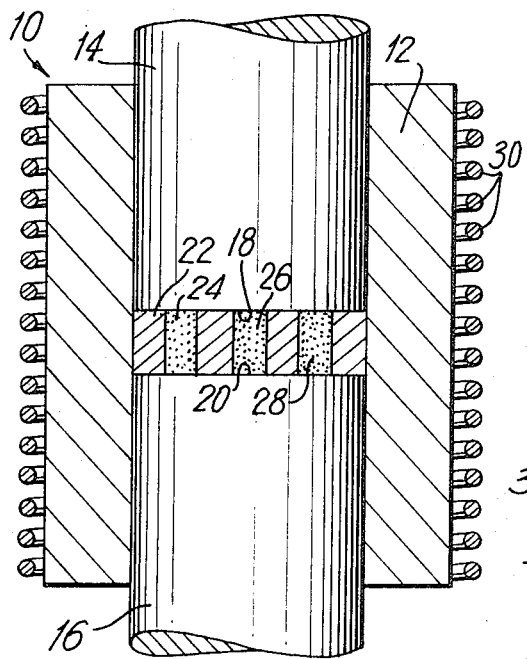
FIG. 1 is a cross sectional view of apparatus employed in the process of the invention.

Referring to the drawings in detail, there is shown in FIG. 1 a hot-pressing apparatus 10 comprising a mold 12 and rams 14, 16. The end faces 18, 20 of rams 14, 16 are in direct contact with compressible retainer member 22 which is provided with cavities 24, 26, 28. Although not shown, an intermediate material may be inserted between end faces of the rams and retainer to act as a release agent. The cavities are filled with a refractory powder or a preformed refractory shape. Heat for the process is provided by heating means such as induction coils 30.

In the operation of the process, the retainer cavities are filled with a refractory material and the retainer is inserted into the mold between rams 14, 16. The rams are then moved toward the inserted assembly and heat is applied. Compressive force from the rams is continued until the refractory material has reached the desired density, ususally close to theoretical density. The rams are then withdrawn and the articles are removed from the cavities. The cycle may then be repeated with another retainer assembly.

Figure 2:
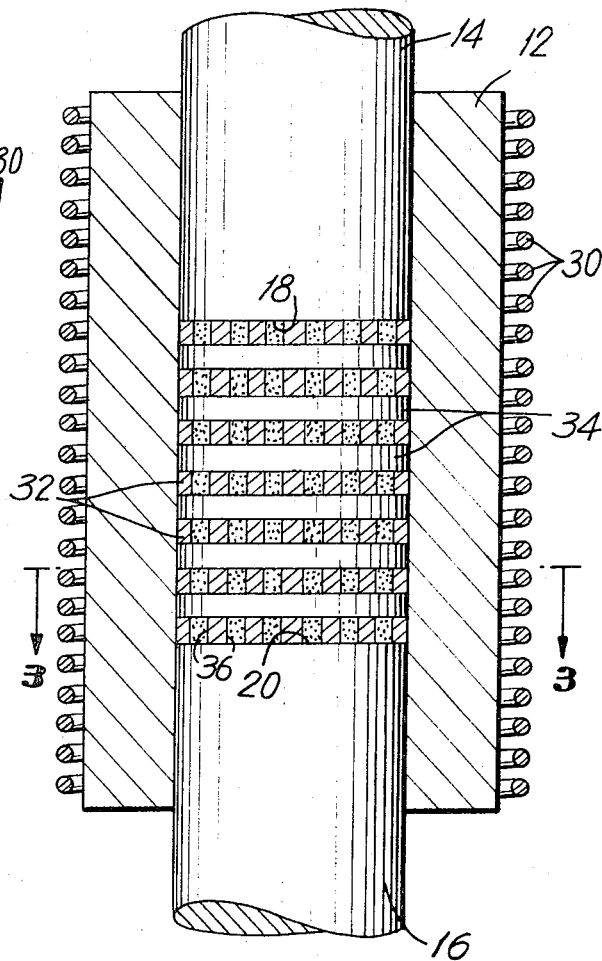
FIG. 2 is a front elevational view of an apparatus employing multi-layers of compressible retainers.
Figure 3:
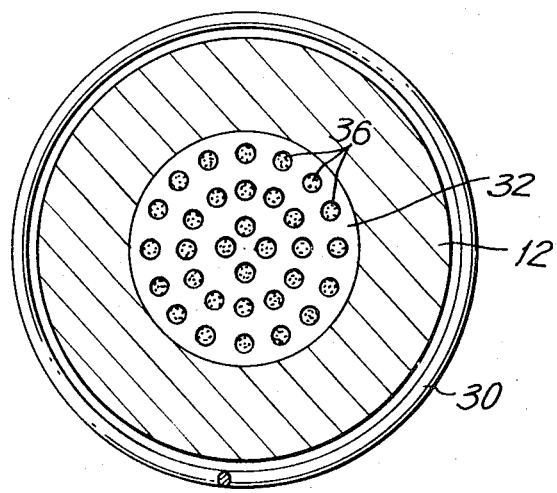
FIG. 3 is a plan view taken along lines 3—3 of FIG. 2.

FIG. 2 illustrates one means which may be employed to increase productivity to an even greater degree with the process of the invention. As there shown, a plurality of retainer members 32 are stacked along the direction of travel of rams 14, 16 while a number of spacer plates 34 separate the retainers. Pressure from the rams is transmitted to the refractory material in the various retainer members while the spacer plates provide support during compression. An example of one configuration of a suitable retainer is shown in FIG. 3 where it can be seen that any array of cavities may readily be used. In FIG. 3, the array is circular, with both the retainer 32 and cavities 36 being circular. Of course, any configuration or shape can be used in the process of the invention.

It will be appreciated that the spacer plates 34 shown in FIG. 2 should have properties corresponding to the retainer material. Thus, graphite spacers were used with Grafoil retainer members and boron nitride spacers with compressible boron nitride retainers. Any combination of materials for spacers and retainers is suitbale provided that chemical compatibility and spacer strength are acceptable.

The following examples are illustrative of the process of the invention:

EXAMPLE I

High purity titanium diboride powder having an average particle size of approximately 3.3 microns was mixed with a 3 percent epoxy resin binder solution and the mixture was cold-pressed at 40,000 p.s.i. into 28 preforms each weighing approximately 9 grams. The preforms measure 0.752 inch in diameter and were 0.3 inch think. The cylindrical preforms were then cured at a temperature of 150° C. for two hours. An average green density of 3 grams per cubic centimeter was measured on these preforms. Four compressible retainers of Grafoil graphite measuring 3 inches in diameter and 0.3 inch thick and having a density of 0.75 gram per cubic centimeter were each provided with equidistant circular cavities having a diameter of 0.754 inch. The preforms were placed in the cavities and the assembly was placed in a graphite mold. A maximum hot-pressing temperature of 1800° C. and a pressure of 2000 p.s.i. was applied for 30 minutes. The assembly was then cooled at the maximum pressure to a temperature of less than 600° C. and the pressure was then removed. The TiB$_2$ preforms increased in diameter to approximately 0.777 inch during the process. The average density of the preforms measured approximately 4.45 grams per cubic centimeter, about 99 percent of the theoretical maximum density of the material.

EXAMPLE II

High purity alumina powder having an average particle size of about 0.3 micron was cold-pressed in a steel die at a pressure of 18,000 p.s.i. into two preforms. Each preform weighed 3.4 grams and measured ½ inch by ½ inch by ½ inch. The preforms had a density of 1.7 grams per cubic centimeter prior to hot-pressing. A compressible Grafoil retainer was prepared with two square cavities being punched therein, the cavities measuring 0.52 inch on each side and ½ inch thick. The density of the compressible retainer was 0.75 gram per cubic centimeter. The assembly was placed into a 1½ inch diameter graphite mold and a maximum pressure of 4500 p.s.i. at a temperature of 1450° C. was applied for 30 minutes. The maximum pressure was maintained during cooling until the preform was cooled to below 600° C. After cooling the Al$_2$O$_3$ articles were easily removed from the compressible retainer without the aid of auxiliary equipment and the density measured an average of 3.98 grams per cubic centimeter which is close to the theoretical density for this material. The ½ inch square articles were increased to approximately 0.533 inch maximum and a diamond pyramid hardness of 2200 kilograms per square millimeter (100 gram load) was measured on a Reichert hardness tester.

EXAMPLE III

A tungsten carbide and cobalt composition of 94% tungsten carbide and 6% cobalt was ball milled in benzene for approximately 72 hours to reduce the average particle size to near 1.0 micron and to disperse cobalt over the tungsten carbide particles. The liquid media was evaporated and the powder was then reduced in hydrogen at 700° C. Thereafter, the powder was cold-pressed into blanks 0.5 x 0.5 x 0.400 inches at 18,000 p.s.i. A 1½ inch diameter Grafoil graphite compressible retainer having a density of 0.7 gram/cubic centimeter was punched with ½ x ½ inch holes to receive the prepressed blanks. The compressible retainer was loaded into a 1½ inch inside diameter graphite hot pressing die and the die was heated to 1350° C. in 45 minutes and a pressure load of 1500 p.s.i. was applied. The pressure was applied gradually reaching full value at 1300° C. The blanks were then cooled to room temperature under maximum pressure. Very little lateral movement was observed in the hot-pressed inserts and as in the previous examples only measured approximately 0.025″ increase from the original shape. The density of the final articles was 14.94 grams/ cubic centimeter (99.3% of theoretical) and the hardness was 92.64 RA. The grain size ranged from 1 to 6 microns in the articles produced.

EXAMPLE IV

High purity TiB$_2$ powder and composite mixtures of high purity powders of TaC+TiB$_1$, TiC+TiB$_2$, and ZrB$_2$+TaN were employed to scale up the compressible retainer process. Fine powders ranging in average particle size from 1.5 to 3.5 microns were blended together to prepare the above compositions. Each blanded composition was prepared according to Example I. Fifty-two inserts of each composition were cold-pressed in a steel die at 40,000 p.s.i. and the cold-pressed inserts measured 0.50 inch square by 0.50 inch thick. Four Grafoil graphite compressible retainers measuring 6¼ inches in diameter by 0.50 inch thick were prepared at a density of 0.75 g./cc. Fifty-two cavities 0.525 inch square were punched in each of the retainers with a spacing of 3/16 inch between each cavity. Each of the retainers was filled with one of the above compositions, and loaded in the graphite mold. A two-inch thick graphite spacer was used between each retainer. A hot-pressing temperature of 2150° C. and a pressure of 2500 p.s.i. was used to provide adequate densification for all four refractory compositions. The assembly was held for 30 minutes at maximum pressure and temperature. Maximum pressure was maintained during cooling to a temperature of 600° C. at which time all pressure was removed. After adequate cooling the inserts were removed from the compressed retainer and little lateral movement was observed in the 208 inserts. The square inserts were enlarged from the cavity size of 0.525 inch to approximately 0.585 inch. This represents a 0.020 inch increase at each side of the square insert. Water immersion density measurements were made on 14 of the 52 $TiC+TiB_2$ inserts which were chosen from various positions in the compresseed retainer. Densities varied from 99.0 to 99.5 percent of the calculated theoretical density values. Water immersion densities were measured on all 52 of the $TiB_2$ inserts. Insert density ranged from 4.36 g./cc. (96.5 percent of the theoretical value) to 4.42 g./cc. (97.5 percent of the theoretical value).

EXAMPLE V

Ten and one-half grams of $TiB_2$ powder according to Example I was cold-pressed in a steel die at 40,000 p.s.i. The cold-pressed preform was 0.75 inch in diameter by 0.48 inch thick and had a green density of 3.3 g./cc. A compressible retainer of boron nitride was cold-pressed at 1000 p.s.i. to a density of 1.0 g./cc. and measured 1½ inches in diameter by 0.48 inch thick. A 0.75 inch diameter hole was drilled in the center of the BN retainer. The $TiB_2$ preform was placed in the BN retainer and the retainer placed in a graphite mold assembly. The mold assembly was heated to a temperature of 1800° C. according to Example II and a maximum pressure of 4000 p.s.i. was applied. Maximum pressure and temperature was held for 30 minutes and the assembly was cooled according to Example II. A water immersion density of of 4.48 g./cc. (99.0 percent of the theoretical value) was measured on the hot-pressed $TiB_2$ insert.

EXAMPLE VI

High-purity boron carbide powder with an average particle size of 5.0 microns and a 3% epoxy resin binder solution were mixed. Twenty-four preforms, weighing 0.60 gram each, were cold-pressed at 50,000 p.s.i. from the mixture. The small preformed pellets measured 0.26 inch in diameter by 0.50 inch long and were oven-cured at 150° C. for 2 hours. An average green density of 1.64 g./cc. (65 percent of the theoretical value 2.52) was measured on the cured pellets. Two Grafoil graphite compressible retainers 1½ inches in diameter by 0.50 inch thick were prepared to a density of .75 g./cc. Twelve 0.257″ diameter cavities were drilled in each of the two retainers. The preformed pellets were loaded into the retainer and both retainers, separated by a ¾ inch thick graphite spacer, were loaded into the graphite mold assembly. Hot-pressing, heating and cooling procedures were according to Example II with the exception of a hot-pressing temperature of 2200° C. and a pressure of 2000 p.s.i. A water immersion denstiy on several of the hot-pressed pellets showed that the theoretical density of 2.52 g./cc. was achieved. A minimal amount of lateral movement was observed in the pellet diameter, with a maximum increase to 0.290 inch being observed.

It should be noted that the geometry and size of refractory shape being fabricated is only limited by tooling requirements prior to hot-pressing. If the desired configuration can be punched or machined into the compressible retainer then multitype hot-pressing may readily be employed to provide large quantities of similarly shaped articles. Thus the process of the invention is effective for hot-pressing high density refractories for tool inserts, dies, gears, washers and other shapes.

The invention is particularly useful in producing refractory cutting tools. The process of the invention enables such materials as the recently developed hard ceramic materials such as tantalum nitride-zironium diboride composite to be economically formed into small articles for uses such as tool bits. Other refractory materials such as tungsten carbide, aluminum oxide, titanium diboride and the like are also easily processed using the techniques described herein.

The time of processing, and the temperature and pressure employed during the process of the invention will vary with the material used for the refractory article, as shown in the examples. Normally, a temperature of at least 1800° C. and a pressure of at least 2000 p.s.i. will be used for the hot-pressing of most refractory hard metal borides, nitrides and carbides. However, it is well within the skill of a practitioner to determine optimum processing conditions to achieve a good quality article having a high density of at least 90% of theoretical density.

What is claimed is:
1. A method for forming articles of a refractory material comprising:
   (a) filling a compressible retainer member having a plurality of cavities with a refractory material, said retainer member being composed of anisotropic graphite which has been expanded by at least a factor of 80 in the C crystallographic axis and then compressed into a cohesive structure which is at least as compressible as said refractory material in a direction parallel to the C crystallographic axis while simultaneously being resistant to movement in a direction perpendicular to said C crystallographic axis;
   (b) subjecting the assembly comprising the expanded graphite retainer containing the refractory material to a simultaneous temperature and pressure application for a time period sufficient to densify said refractory material to at least 90% of theoretical density, said pressure being applied parallel to the C crystallographic axis of the expanded graphite retainer; and then
   (c) removing the densified refractory article from said expanded graphite retainer.
2. The process of claim 1 wherein in step (b) said temperature is at least 1350° C. and wherein said pressure is at least 1500 p.s.i.
3. The process of claim 2 wherein in step (b) said temperature is at least 1800° C. and said pressure is at least 2000 p.s.i.
4. The process as in claim 1 wherein in step (a) said refractory material is selected from a group consisting of titanium diboride, mixtures of titanium diboride and titanium carbide, mixtures of titanium diboride and tantalum carbide, mixtures of tungsten carbide and cobalt, mixtures of zirconium diboride and tantalum nitride, boron carbide, boron nitride, aluminum oxide and tungsten carbide.
5. The process of claim 1 wherein in step (a) at least two expanded graphite retainers are stacked on top of each other prior to the application of said temperature and pressure and wherein a refractory spacer plate is positioned between adjacent retainers.
6. A process for forming articles of a refractory material, comprising:
   (a) filling a compressible retainer member having a plurality of cavities with a refractory material, said retainer member being composed of graphite expanded by at least a factor of 80 in the C crystallographic axis and being at least as compressible as said refractory material;
   (b) placing the assembly comprising the expanded graphite retainer containing the refractory material in a hot-pressing mold having at least one pressing ram, said expanded graphite retainer being positioned in such a way that the direction of movement of the ram is parallel to the C crystallographic axis of the graphite;
(c) compressing the assembly with said ram while simultaneously applying heat to said refractory material for a period sufficient to densify said refractory material to at least 90% of theoretical density; and then
(d) removing said densified refractory articles from said expanded graphite retainer.

7. The process of claim 6 wherein in step (b) said refractory material is heated to at least 1350° C. and said ram applies a pressure to the refractory material of at least 1500 p.s.i.

8. The process of claim 7 wherein in step (b) said temperature is at least 1800° C. and said pressure is at least 2000 p.s.i.

9. The process of claim 6 wherein in step (a) said refractory material is selected from a group consisting of titanium diboride, mixtures of titanium diboride and titanium carbide, mixtures of titanium diboride and tantalum carbide, mixtures of tungsten carbide and cobalt, mixtures of zirconium diboride and tantalum nitride, boron carbide, boron nitride, aluminum oxide and tungsten carbide.

10. The process of claim 10 wherein in step (a) at least two expanded graphite retainers are stacked on top of each other and a refractory spacer plate is positioned between adjacent retainers; and wherein in step (b) said assembly comprises the expanded graphite retainers containing the refractory material, and the refractory spacer.

References Cited

UNITED STATES PATENTS

| | | | |
|---|---|---|---|
| 2,169,280 | 8/1939 | Pfanstiehl | 264—111 |
| 2,691,801 | 10/1954 | Robb | 264—219 |
| 3,230,286 | 1/1966 | Bobrowsky | 264—332 |
| 3,279,917 | 10/1966 | Ballard et al. | 264—332 |
| 3,340,270 | 9/1967 | King | 264—332 |
| 3,363,037 | 1/1968 | Lever, Jr. et al. | 264—125 |
| 3,383,737 | 5/1968 | Greger | 264—332 |
| 3,404,061 | 10/1968 | Shane et al. | 264—109 |
| 3,413,392 | 11/1968 | Meadows | 264—125 |
| 3,465,074 | 9/1969 | Neuroth et al. | 264—125 |
| 3,467,745 | 9/1969 | Lambertson et al. | 264—332 |

FOREIGN PATENTS

| | | | |
|---|---|---|---|
| 487,812 | 11/1952 | Canada | 264—332 |

JULIUS FROME, Primary Examiner

J. H. MILLER, Assistant Examiner

U.S. Cl. X.R.

264—125, 332, 337

UNITED STATES PATENT OFFICE
CERTIFICATE OF CORRECTION

Patent No. 3,632,708          Issue Date January 4, 1972

Inventor(s)    V. Mandorf et al.

It is certified that error appears in the above-identified patent and that said Letters Patent are hereby corrected as shown below:

Column 1, line 24

Delete "mode" after "mold"

Column 1, line 51

Delete "," after "processed"

Column 3, line 31

"ususally" should be --usually--

Column 3, line 54

"suitbale" should be --suitable--

Column 3, line 66

"think" should be --thick--

Column 4, line 66

"$TiB_1$" should be --$TiB_2$--

Column 4, line 69

"blanded" should be --blended--

Claim 10, line 26

"10" should be --1--

Signed and sealed this 1st day of May 1973.

(SEAL)
Attest:

EDWARD M. FLETCHER, JR.　　　　　　ROBERT GOTTSCHALK
Attesting Officer　　　　　　　　　　Commissioner of Patents